(12) United States Patent
Kim et al.

(10) Patent No.: US 11,974,115 B2
(45) Date of Patent: Apr. 30, 2024

(54) ACTIVE SOUND DESIGN (ASD) TUNING DEVICE OF VEHICLE AND METHOD THEREOF

(71) Applicants: HYUNDAI MOTOR COMPANY, Seoul (KR); Kia Corporation, Seoul (KR)

(72) Inventors: Ki Chang Kim, Suwon-si (KR); Dong Chul Park, Anyang-si (KR); Eun Soo Jo, Hwaseong-si (KR); Jin Sung Lee, Hwaseong-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 150 days.

(21) Appl. No.: 17/469,154

(22) Filed: Sep. 8, 2021

(65) Prior Publication Data
US 2022/0369059 A1    Nov. 17, 2022

(30) Foreign Application Priority Data
May 4, 2021    (KR) .................. 10-2021-0057976

(51) Int. Cl.
| | |
|---|---|
| H04S 7/00 | (2006.01) |
| B60R 16/023 | (2006.01) |
| G06F 30/20 | (2020.01) |
| H04L 12/40 | (2006.01) |
| H04L 67/12 | (2022.01) |
| H04R 5/02 | (2006.01) |

(52) U.S. Cl.
CPC ............. *H04S 7/30* (2013.01); *B60R 16/023* (2013.01); *G06F 30/20* (2020.01); *H04L 12/40032* (2013.01); *H04L 67/12* (2013.01); *H04R 5/02* (2013.01); *H04L 2012/40215* (2013.01); *H04R 2499/13* (2013.01)

(58) Field of Classification Search
CPC . H04S 7/30; G06F 30/20; G06F 30/15; B60R 16/023; H04L 12/40032; H04L 67/12; H04L 2012/40215; H04R 5/02; H04B 1/082
USPC .......................................... 381/302, 71.4, 86
See application file for complete search history.

(56) References Cited

U.S. PATENT DOCUMENTS

| | | | |
|---|---|---|---|
| 2017/0330550 A1* | 11/2017 | Lee ........................ | F02B 77/13 |
| 2018/0090125 A1 | 3/2018 | Yeung | |
| 2020/0342846 A1* | 10/2020 | Cai ................... | G10K 11/17873 |
| 2021/0201885 A1* | 7/2021 | Bastyr ................... | H04R 1/025 |

FOREIGN PATENT DOCUMENTS

| | | |
|---|---|---|
| EP | 3631388 A1 | 4/2020 |
| JP | 2002-233001 A | 8/2002 |
| JP | 4972231 B2 | 7/2012 |

(Continued)

*Primary Examiner* — Ahmad F. Matar
*Assistant Examiner* — Sabrina Diaz
(74) *Attorney, Agent, or Firm* — MORGAN, LEWIS & BOCKIUS LLP

(57) ABSTRACT

An active sound design (ASD) tuning device and a method thereof may include an ASD device that generates a virtual engine sound for each vehicle situation and a control device that outputs a composite sound by correcting and synthesizing the virtual engine sound and an internal sound measured for each vehicle situation based on a binaural vehicle impulse response (BVIR).

13 Claims, 13 Drawing Sheets

(56) References Cited

FOREIGN PATENT DOCUMENTS

| KR | 10-2017-0014050 A | 2/2017 |
|---|---|---|
| KR | 10-1856935 B1 | 5/2018 |
| KR | 10-2020598 B1 | 9/2019 |
| KR | 10-2131391 B1 | 7/2020 |
| WO | 2018/215749 A1 | 11/2018 |

* cited by examiner

◇ PROTOCOL : Fast Data eXchange(FDX) protocol (Step1) DEFINE SYSTEM VARIABLE

+ DEFINE ASD TUNING SIMULATOR DRIVE SIGNAL
+ EXTRACT REAL-VEHICLE CAN SIGNAL FOR RUNNING ASD ALGORITHM
+ MAP TUNING SIMULATOR SIGNAL AND REAL-VEHICLE CAN SIGNAL

(Step2) VISUALIZATION

+ CONFIGURE FDX PROTOCOL
+ INTERWORK WITH CANOE OF VECTOR COMPANY (OUR STANDARDS)

(Step3) SYSTEM INTEGRATION AND INSTALLATION

+ CONSTRUCT ENVIRONMENT FOR TRANSMITTING CAN SIGNAL
+ ADD AAF AND MCU NETWORK NODE (MANIPULATE VIRTUAL H/U)

FIG.8

ACTIVE SOUND DESIGN (ASD) TUNING DEVICE OF VEHICLE AND METHOD THEREOF

CROSS-REFERENCE TO RELATED APPLICATION

The present application claims priority to Korean Patent Application No. 10-2021-0057976, filed on May 4, 2021, the entire contents of which is incorporated herein for all purposes by this reference.

BACKGROUND OF THE INVENTION

Field of the Invention

The present invention relates to an active sound design (ADS) tuning device of a vehicle and a method thereof, and more particularly, relates to technologies of turning a virtual engine sound of a vehicle in a virtual environment.

Description of Related Art

To develop noise, vibration, harshness (NVH) of a vehicle or an active sound design (ASD) in an existing technology, an environment capable of manufacturing and operating a prototype of vehicle should be established.

Because evaluation and validation or tuning should proceed when the vehicle is traveling due to characteristics of the development environment of the NVH and the ASD and because the driver is able to be exposed to the risk of accidents, there is a demand for preventive measures against safety accidents when sound is tuned by a driving test of the real vehicle.

Because a driver and a developer are positioned due to such safety, this may put a burden on labor costs. As described above, because a prototype of vehicle is manufactured, costs are incurred. Because NVH characteristics are different from each other according to an engine/motor, a mission, a fuel type, or the like when such a prototype of vehicle is manufactured, all vehicles should be manufactured to suit the number of cases. Because ASD sound characteristics are varied according to a provider which provides an ASD system, it costs a lot to manufacture a vehicle when including the number of cases.

The information disclosed in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing an ASD tuning device of a vehicle for tuning an ASD signal in a virtual environment by a program rather than a rear-vehicle test method upon ASD tuning to minimize restriction of the environment and costs and a method thereof.

The technical problems to be solved as various exemplary embodiments of the present invention are not limited to the aforementioned problems, and any other technical problems not mentioned herein will be clearly understood from the following description by those skilled in the art to which various exemplary embodiments of the present invention pertains.

According to various aspects of the present invention, an active sound design (ASD) tuning device of a vehicle may include an ASD device that generates a virtual engine sound for each vehicle situation and a control device that outputs a composite sound by correcting and synthesizing the virtual engine sound and an internal sound measured for each vehicle situation based on a binaural vehicle impulse response (BVIR).

In various exemplary embodiments of the present invention, the ASD tuning device may further include a controller area network (CAN) interface that receives a CAN signal for each vehicle situation and delivers the CAN signal to the ASD device and the control device.

In various exemplary embodiments of the present invention, the ASD tuning device may further include a connection terminal that converts a format of the signal delivered to the ASD device by the CAN interface.

In various exemplary embodiments of the present invention, the ASD device may generate the virtual engine sound based on a tuning parameter for each vehicle situation.

In various exemplary embodiments of the present invention, the control device may compare the composite sound with a previously stored target sound.

In various exemplary embodiments of the present invention, the control device may compare the composite sound with a previously stored target sound.

In various exemplary embodiments of the present invention, the control device may feedback the result of comparing the composite sound with the target sound to the ASD device, when the control device determines that the composite sound is not identical to the previously stored target sound.

In various exemplary embodiments of the present invention, the control device may manage internal sound data measured for each vehicle situation and BVIR data being sound field characteristic information from a sound source to ears of a user.

In various exemplary embodiments of the present invention, the ASD tuning device may further include a simulator that outputs the composite sound in a virtual environmental condition similar to the reality.

In various exemplary embodiments of the present invention, the simulator may include at least one of a player, a seat, or a virtual reality (VR) system.

In various exemplary embodiments of the present invention, the control device may synchronize and synthesize the internal sound with the virtual engine sound in real time.

In various exemplary embodiments of the present invention, the CAN signal for each vehicle situation may include at least one of revolutions per minute (RPM), a speed, an accelerator pedal sensor (APS), or torque.

In various exemplary embodiments of the present invention, the tuning parameter for each vehicle situation may include at least one of pitch control, gain control, APS control, frequency filter, volume adjustment, or Shepard layer control.

According to various aspects of the present invention, an active sound design (ASD) tuning method of a vehicle may include generating a virtual engine sound for each vehicle situation and outputting, by a control device, a composite sound by correcting and synthesizing the virtual engine sound and an internal sound measured for each vehicle situation based on a binaural vehicle impulse response (BVIR).

In various exemplary embodiments of the present invention, the generating of the virtual engine sound for each vehicle situation may include collecting, by the control device, a CAN signal for each vehicle situation.

In various exemplary embodiments of the present invention, the generating of the virtual engine sound for each vehicle situation may further include generating, by the control device, the virtual engine sound based on the CAN signal for each vehicle situation and a tuning parameter for each vehicle situation.

In various exemplary embodiments of the present invention, the ASD tuning method may further include comparing the composite sound with a previously stored target sound.

In various exemplary embodiments of the present invention, the ASD tuning method may further include outputting, by the control device, the composite sound as a final virtual engine sound, when the control device determines that the composite sound is identical to the previously stored target sound.

In various exemplary embodiments of the present invention, the ASD tuning method may further include feeding back, by the control device, the result of comparing the composite sound with the target sound, when the composite sound is not identical to the previously stored target sound.

In various exemplary embodiments of the present invention, the ASD tuning method may further include previously storing and managing internal sound data measured for each vehicle situation and BVIR data being sound field characteristic information from a sound source to ears of a user.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIG. 8 is a drawing illustrating a CAN interface development process according to various exemplary embodiments of the present invention;

Figure 1:
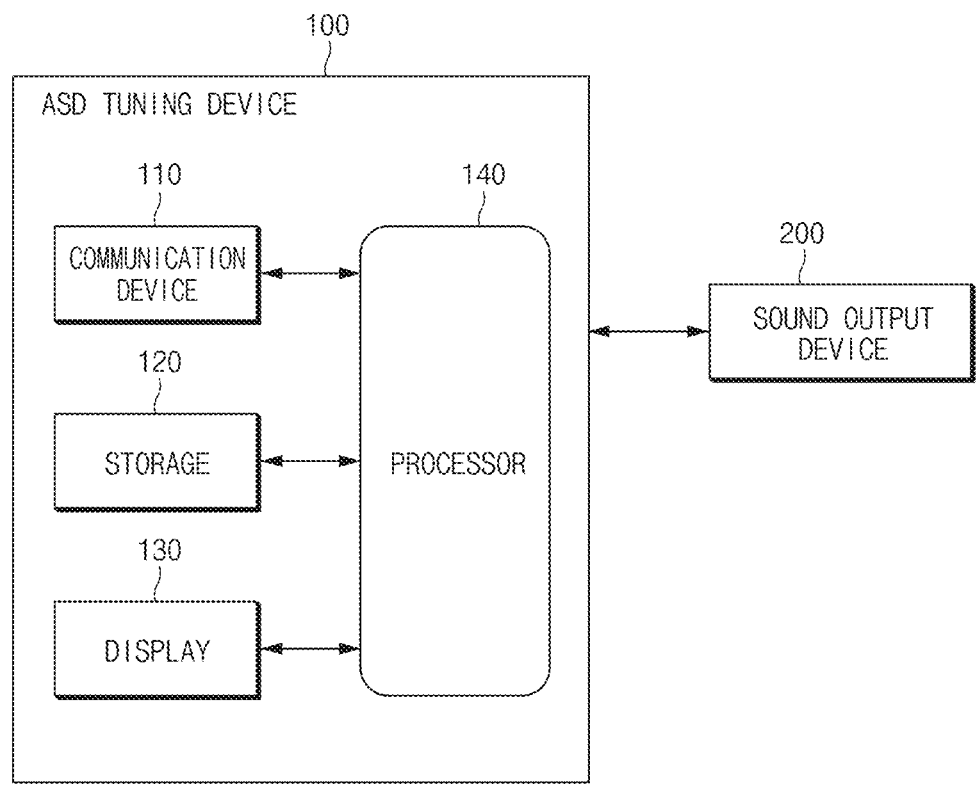
FIG. 1 is a block diagram illustrating a configuration of a vehicle system including an active sound design (ASD) tuning device of a vehicle according to various exemplary embodiments of the present invention.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Hereinafter, various exemplary embodiments of the present invention will be described in detail with reference to the exemplary drawings. In adding the reference numerals to the components of each drawing, it may be noted that the identical or equivalent component is designated by the identical numeral even when they are displayed on other drawings. Furthermore, in describing the exemplary embodiment of the present invention, a detailed description of well-known features or functions will be ruled out in order not to unnecessarily obscure the gist of the present invention.

In describing the components of the exemplary embodiment according to various exemplary embodiments of the present invention, terms such as first, second, "A", "B", (a), (b), and the like may be used. These terms are merely intended to distinguish one component from another component, and the terms do not limit the nature, sequence or order of the constituent components. Unless otherwise defined, all terms used herein, including technical or scientific terms, have the same meanings as those generally understood by those skilled in the art to which various exemplary embodiments of the present invention pertains. Such terms as those defined in a used dictionary are to be interpreted as having meanings equal to the contextual meanings in the relevant field of art, and are not to be interpreted as having ideal or excessively formal meanings unless clearly defined as having such in the present application.

Hereinafter, embodiments of the present invention will be described in detail with reference to FIG. 1, FIG. 2, FIG. 3, FIG. 4, FIG. 5, FIG. 6, FIG. 7, FIG. 8 and FIG. 9B.

FIG. 1 is a block diagram illustrating a configuration of a vehicle system including an active sound design (ASD)

tuning device of a vehicle according to various exemplary embodiments of the present invention.

Referring to FIG. 1, the vehicle system according to various exemplary embodiments of the present invention may include an ASD tuning device 100 and a sound output device 200.

The ASD tuning device 100 according to various exemplary embodiments of the present invention may be implemented as a separate device in a vehicle to be connected to control units of the vehicle by a separate connection means. Furthermore, the ASD tuning device 100 may be implemented as an active sound design (ASD) hardware-in-the-loop simulation (HILs).

The ASD tuning device 100 may provide a user with a virtual environment of a similar level to the reality to verify and tune a noise, vibration, harshness (NVH) system and an ASD system of the vehicle in a virtual environment such that the user may safely and conveniently develop a sound.

Referring to FIG. 1, the ASD tuning device 100 may include a communication device 110, a storage 120, a display 130, and a processor 140.

The communication device 110 may be a hardware device implemented with various electronic circuits to transmit and receive a signal through a wireless or wired connection, which may transmit and receive information with device samples (e.g., an accelerator or the like) in the vehicle based on a network communication technology.

The storage 120 may store data, an algorithm, and/or the like necessary for an operation of the processor 140. The storage 120 may store an ASD algorithm for generating a virtual engine sound, an algorithm for synthesizing a default internal sound with an ASD sound or separating the default internal sound from the ASD sound, or the like. Furthermore, the storage 120 may store default internal sound data measured for each manipulation, a tuning parameter for each manipulation, a target sound, or the like. In the instant case, the default internal sound data measured for each manipulation may be, for example, data obtained by measuring an internal sound in the vehicle for each manipulation where a user steps on the accelerator or where the user turns the steering wheel, and internal sound data may be stored in a database for every various manipulation situations. Furthermore, the tuning parameter for each manipulation may be a parameter for tuning an ASD sound for each manipulation where the user steps the accelerator or where the user turns the steering wheel, which may be stored in a database. Furthermore, the target sound may be stored in advance by experimental values and may be stored in advance by experimental values for each manipulation of the user.

The storage 120 may include at least one type of storage medium, such as a flash memory type memory, a hard disk type memory, a micro type memory, a card type memory (e.g., a secure digital (SD) card or an extreme digital (XD) card), a random access memory (RAM), a static RAM (SRAM), a read-only memory (ROM), a programmable ROM (PROM), an electrically erasable PROM (EEPROM), a magnetic RAM (MRAM), a magnetic disk, and an optical disk.

The interface 130 may include an input means for receiving a control command from the user and an output means for outputting an operation state, an operation result, or the like of the ASD tuning device 100. The input means may allow the user to set a parameter for tuning a sound.

Herein, the input means may include a key button and may further include a mouse, a joystick, a jog shuttle, a stylus pen, or the like. Furthermore, the input means may further include a soft key implemented on a display.

Figure 2A:
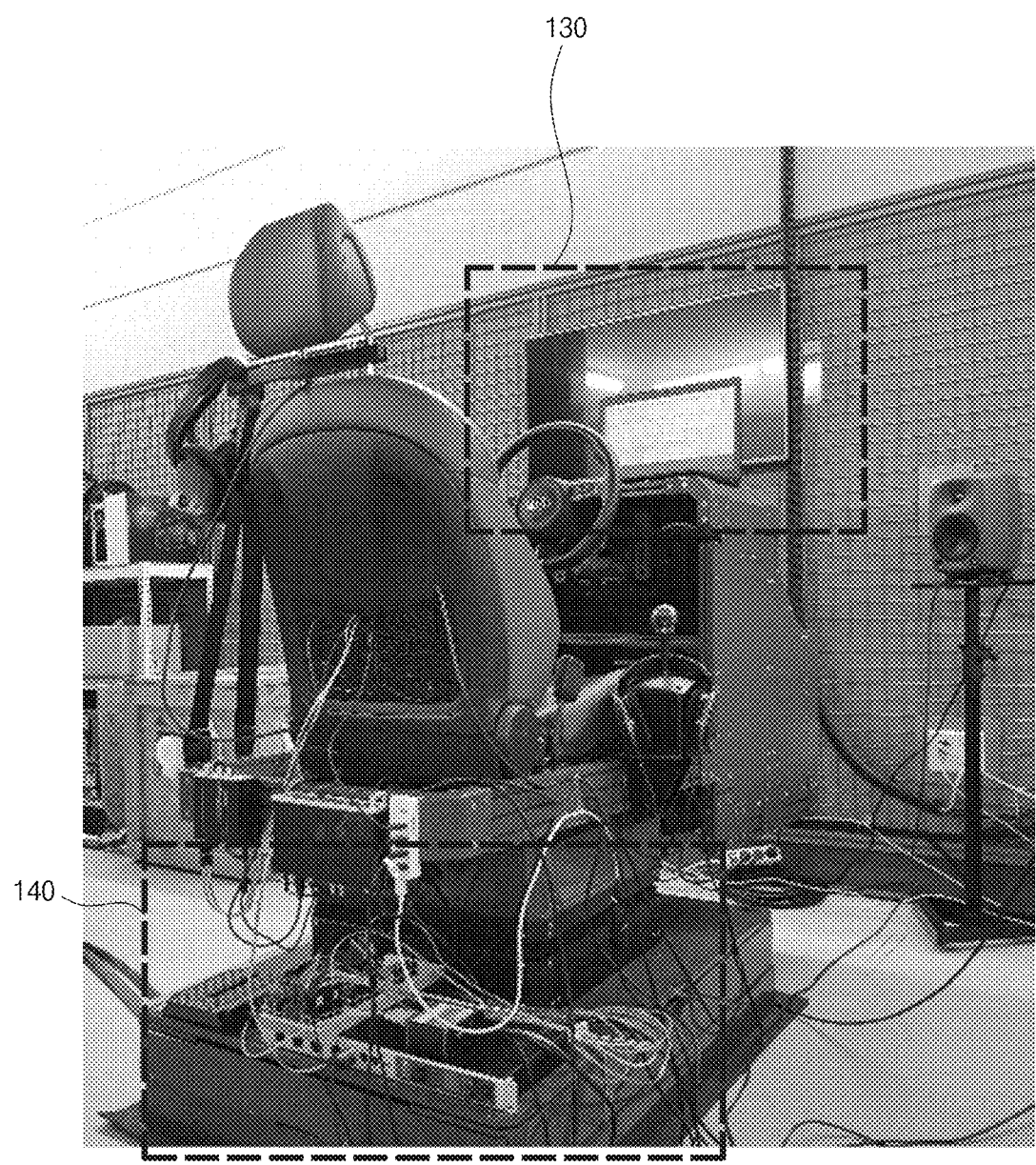
FIG. 2A is a drawing illustrating an exemplary screen where an ASD tuning device of a vehicle is actually implemented according to various exemplary embodiments of the present invention.

FIG. 2A is a drawing illustrating an exemplary screen where an ASD tuning device of a vehicle is actually implemented according to various exemplary embodiments of the present invention.

Figure 6:
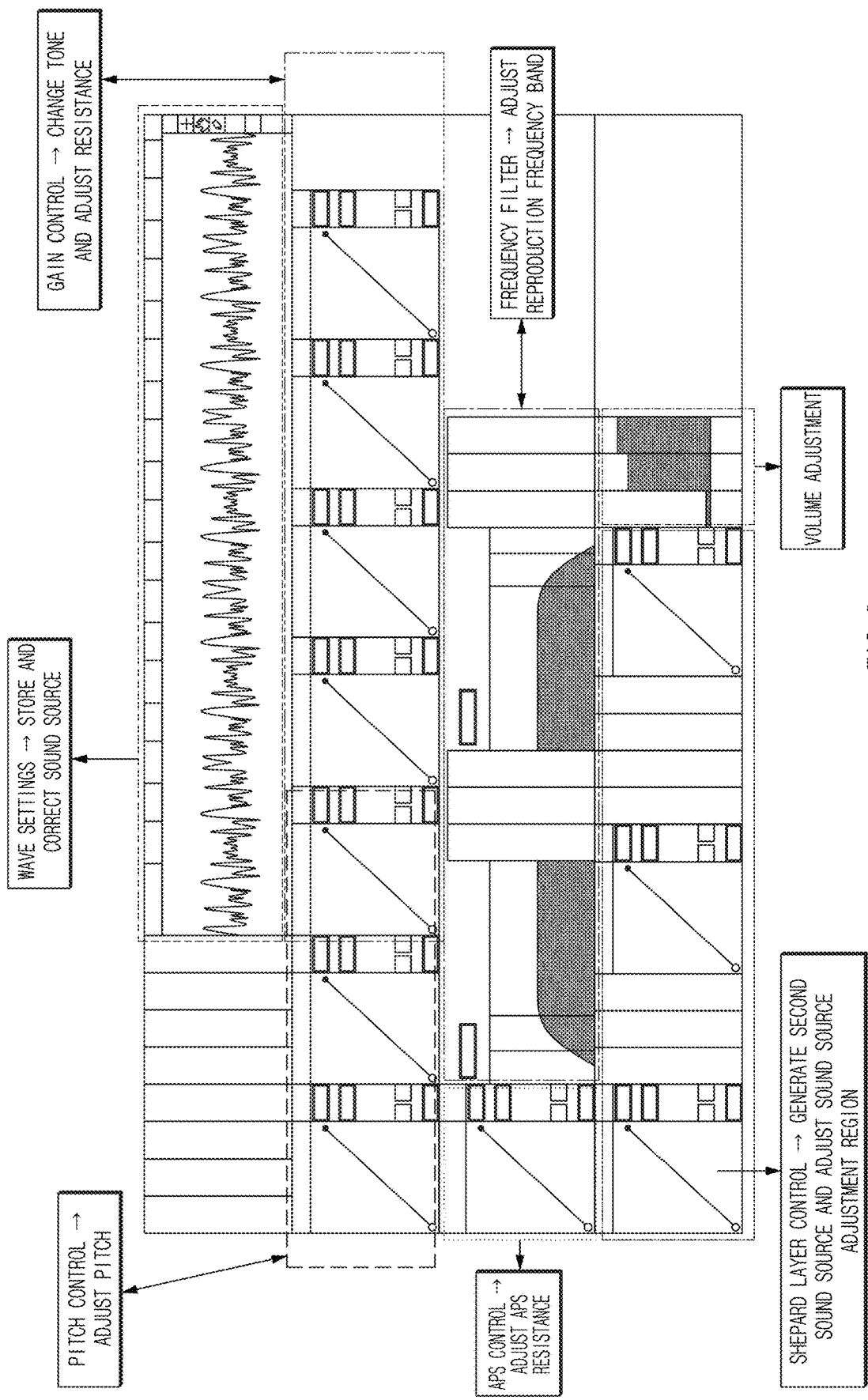
FIG. 6 is a drawing illustrating a sound tuning exemplary screen according to various exemplary embodiments of the present invention.

As shown in FIG. 2A, a display 130 may be implemented as a separate monitor to be electrically connected to a processor 140, which may display a tuning parameter manipulation screen for tuning an ASD sound as shown in FIG. 6. Thereafter, a description will be provided in detail of manipulation of a tuning parameter with reference to FIG. 6.

An output means may include a display and may further include a voice output means such as a speaker. In the instant case, when a touch sensor such as a touch film, a touch sheet, or a touch pad is provided in the display, the display may operate as a touchscreen and may be implemented in a form where the input means and the output means are integrated with each other. In the instant case, the display may include at least one of a liquid crystal display (LCD), a thin film transistor-LCD (TFT-LCD), an organic light-emitting diode (OLED) display, a flexible display, a field emission display (FED), or a three-dimensional (3D) display.

The processor 140 may be electrically connected to the communication device 110, the storage 120, the display 130, or the like and may electrically control the respective components. The processor 140 may be an electrical circuit which executes instructions of software and may perform a variety of data processing and calculation described below.

The processor 140 may process a signal delivered between the respective components of an ASD tuning device 100 of a vehicle and may perform the overall control such that the respective components may normally perform their own functions.

Such a processor 140 may be implemented in a form of hardware, may be implemented in a form of software, or may be implemented in a form of a combination thereof. The processor 140 may be implemented as a microprocessor.

The processor 140 may generate a virtual engine sound for each vehicle situation, may output a composite sound by correcting and synthesizing the virtual engine sound and an internal sound measured for each vehicle situation based on a binaural vehicle impulse response (BVIR), may compare the composite sound with a previously stored target sound, and repeatedly perform the above process until the composite sound is similar to the previously stored target sound.

Equations 1 to 4 below are formulas for describing the concept of the BVIR.

Equations 1 and 2 are about circular deconvolution.

$$h(t) = IFFT\left[\frac{FFT(y(t))}{FFT(x(t))}\right] \quad \text{[Equation 1]}$$

H(t) is the output value, and x(t) and y(t) are the input values. Y(t) may take an average to enhance a signal-to-noise ratio (SNR).

$$h(t) = IFFT(H_2) = IFFT\left[\frac{G_{xy}}{G_{xx}}\right] \quad \text{[Equation 2]}$$

Equation 2 above is a method using a mean cross-spectrum auto-spectrum.

Because it is assumed that the input signal is repeated indefinitely in Fast Fourier Transform (FFT), a time aliasing error occurs. When the time aliasing error occurs, a reverberating impulse response portion is added to an impulse response start portion. Furthermore, when the signal of the input end is weakened at a specific frequency, because dividing calculation is unstable, an error occurs.

Equations 3 to 5 are about linear deconvolution.

$$x(t) = \sin\left[\frac{\omega_1 T}{\log\left(\frac{\omega_2}{\omega_1}\right)} \cdot \left(e^{\frac{1}{T}\log\left(\frac{\omega_2}{\omega_1}\right)} - 1\right)\right]$$ [Equation 3]

The input inverse function f(t) becomes a signal obtained by reversing the input signal along a time axis. Because the linear sweep has an even energy distribution in a frequency domain, but the log sweep does not have the even energy distribution in the frequency domain, an envelope should be corrected like Equation 4 below.

$$env(t) = 10^{\left(-\frac{6}{20}\log 2\left(\frac{\omega}{\omega_1}\right)\right)} \text{ where}$$ [Equation 4]

$$\omega = \omega_1 e^{\frac{t}{T}\log\left(\frac{\omega_2}{\omega_1}\right)}$$

Thus, the linear deconvolution may be represented as Equation 5 below.

$$h(t)=y(t)*f(t)$$ [Equation 5]

Figure 2B:
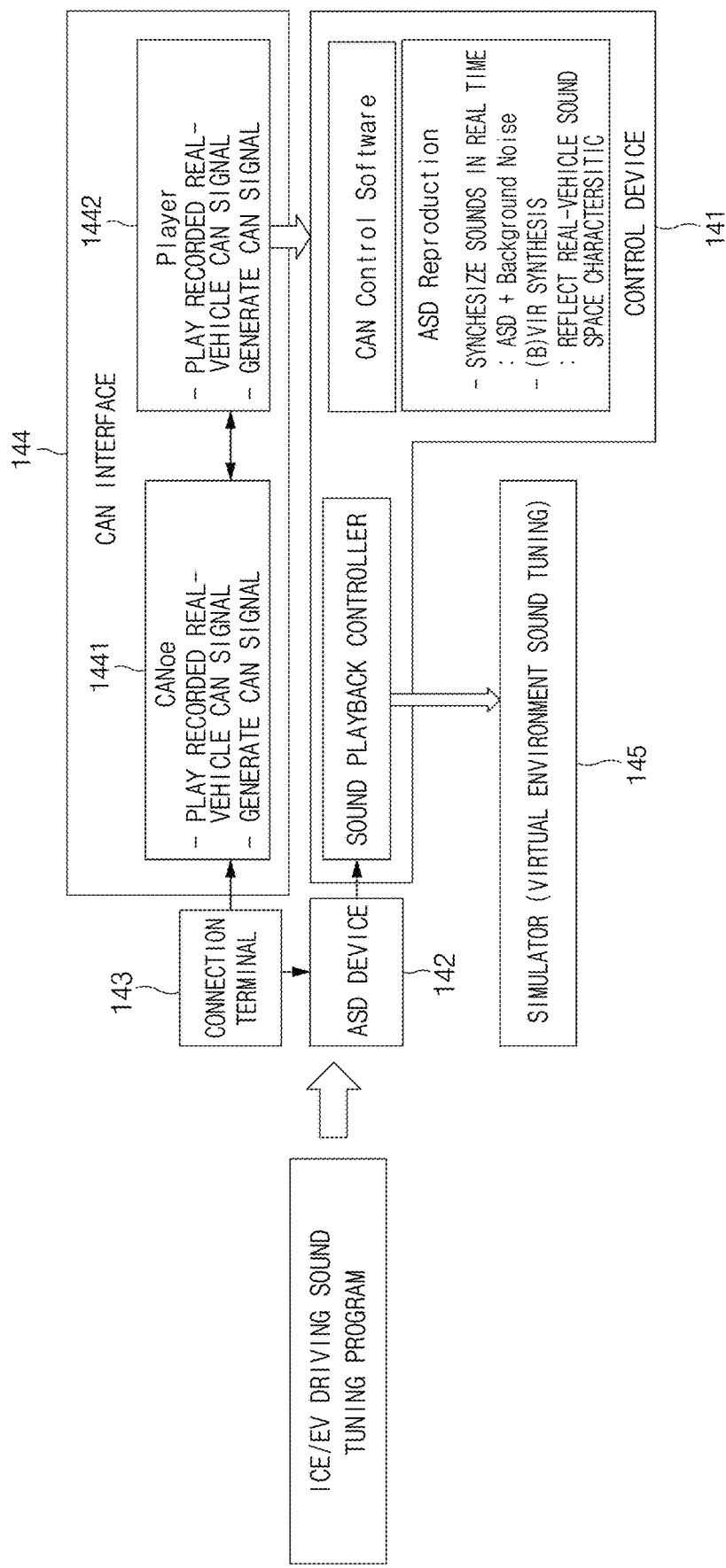
FIG. 2B is a block diagram illustrating a detailed configuration of a processor of an ASD tuning device of a vehicle according to various exemplary embodiments of the present invention.

FIG. 2B is a block diagram illustrating a detailed configuration of a processor of an ASD tuning device of a vehicle according to various exemplary embodiments of the present invention.

A processor 140 of FIG. 1 may include a control device 141, an ASD device 142, a connection terminal 143, a controller area network (CAN) interface 144, and a simulator 145.

The control device 141 may perform the overall operation of an ASD tuning device 100 of FIG. 1, may store and manage default internal sound data generated by recording an NVH sound of a real vehicle, may store and manage information of a sound field characteristic from a sound source (e.g., a speaker) in the real vehicle to ears of a person (hereinafter referred to as "binaural vehicle impulse response (BVIR)"), and may generate, collect, and process a CAN signal configured for an operation state of the vehicle.

The control device 141 may include a sound playback controller. The sound playback controller may synthesize, separate, or amplify a sound recorded in the real vehicle and an ASD sound played by the ASD device 142 and may output a final composite sound tuned in a virtual environment, via a simulator 145.

The ASD device 142 may generate or play an ASD sound to suit a CAN signal (e.g., vehicle manipulation) based on an ASD algorithm. For example, when the accelerator of the vehicle is pressed, the ASD device 142 may generate and output an ASD sound suitable for when the accelerator is pressed.

The connection terminal 143 may have a different system configuration depending on an ASD provider and may change a circuit channel to operate normally in a response to the different system configuration. For example, when receiving revolutions per minute (RPM) signal via the CAN interface 144, the connection terminal 143 may change a format of the RPM signal to suit a format of the ASD device 142.

The CAN interface 144 may record, play, generate, or transmit and receive rear vehicle driving information between the respective devices. In other words, the CAN interface 144 may play a role as a CAN signal transmitter which transmits and receives a CAN signal collected in a real vehicle to the ASD device 142 and the control device 141.

The CAN interface 144 may include a controller area network open environment (CANoe) 1441 and a player 1442, which play the same signal as the vehicle using a CAN signal obtained in the vehicle or may manipulate the obtained signal and transmit and receive a CAN signal between the ASD device 142 and the control device 141.

Accordingly, the ASD tuning device 100 may generate and play a virtual engine sound and may output an environment of the same level as the reality, including a visual effect. To the present end, the simulator 145 may include a player configured for allowing a user to listen to a result, a seat on the user may sit, a virtual reality (VR) system for helping with a virtual driving environment, or the like.

Because the above-mentioned respective components of the ASD tuning device 100 are controlled by embedded software (S/W) suitable for a corresponding area, they may use a laptop, a tablet, or a smartphone depending on an environment in which S/W is run, but may be generally implemented by a laptop in which Window OS is provided.

A sound output device 200 of FIG. 1 may include the same player as a vehicle speaker or may include a player, such as a headset, different from the real vehicle. A sense of difference of an auditory experience due to the difference between the speaker of the real vehicle and the player in the virtual environment may be corrected using BVIR information stored in the control device 141. As a result, the auditory experience of the level of the real vehicle may be provided.

Accordingly, an exemplary embodiment of the present invention may provide the user with an environment of a similar level to the reality to verify and tune the NVH system and the ASD of the vehicle in the virtual environment such that the user may safely and conveniently develop a sound, and may ensure a correlation between the real vehicle and the system to ensure safety and save costs.

Furthermore, an exemplary embodiment of the present invention may reduce a noise factor due to surrounding noise when the real vehicle travels, may minimize driving dispersion, may ensure reliable data, and may perform more realistic system comparison and assessment.

Figure 3:
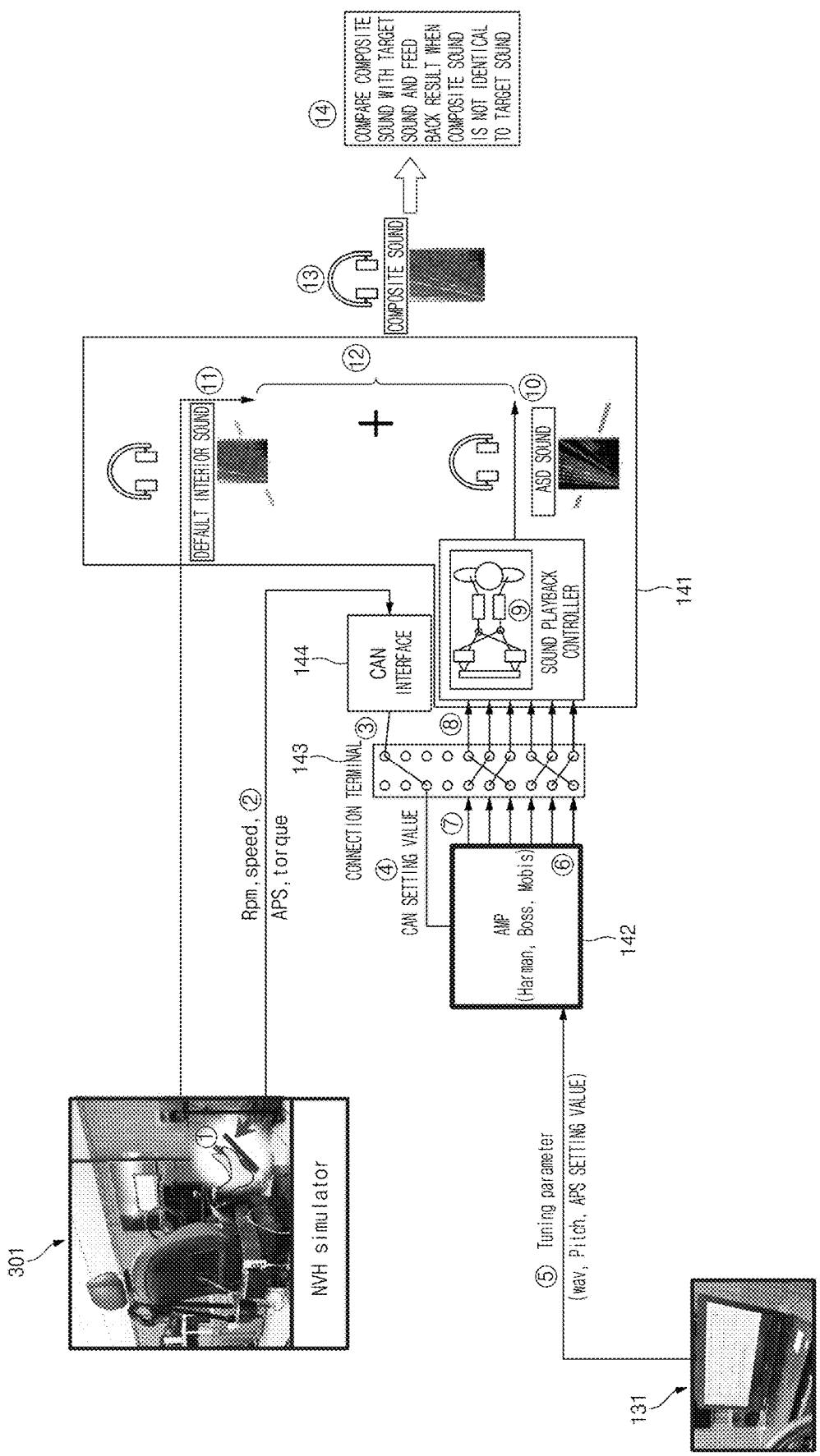
FIG. 3 is a drawing illustrating an ASD tuning process of a vehicle according to various exemplary embodiments of the present invention.

FIG. 3 is a drawing illustrating an ASD tuning process of a vehicle according to various exemplary embodiments of the present invention.

Referring to FIG. 3, when the amount of pressing of an accelerator pedal of a simulator occurs in operation ①, in operation ②, a CAN signal (e.g., a parameter determined in a simulator model) according to the amount of pressing of the accelerator pedal may be output to be delivered to a CAN interface 144. For example, the parameter may include an RPM, a speed, an accelerator pedal sensor (APS), or torque.

When the CAN interface 144 delivers the CAN signal to a connection terminal 143 in operation ③, in operation ④, the connection terminal 143 may deliver the CAN signal to an AMP of an ASD device 142. In operation ⑤, a parameter of a sound tuning program may be delivered to the AMP of the ASD device 142.

Thus, in operation ⑥, the AMP of the ASD device 142 may determine an output value according to the tuning parameter and the CAN signal. In operation ⑦, the AMP of the ASD device 142 may deliver the determined output signal to the connection terminal 143.

In operation ⑧, the AMP of the ASD device 142 may deliver the output signal (ASD sound) to a control device 141 via the connection terminal 143. In operation ⑨, the control device 141 may convert 6 or 7 output signals input via the connection terminal 143 into a stereo signal. In operation ⑩, the control device 141 may output the converted stereo sound (ASD sound). In operations ⑪ and ⑫, the control device 141 may synchronize and synthesize a sound recorded in the real vehicle with the ASD sound in real time. In operation ⑬, the control device 141 may output the synthesized stereo sound to a headphone. In operation ⑭, the control device 141 may compare the composite sound with a predetermined target sound, may select the composite sound when the composite sound is identical to the target sound, and may feedback the compared result to the ASD device 142 to reflect it in generating the ASD sound, when the composite sound is not identical to the target sound, thus repeating it until a composite sound (a virtual engine sound) identical to the target sound is output. In the instant case, the target sound may be a composite sound in an ideal situation, which may deteriorate to be heard, when the target sound is output from the vehicle. Thus, of the present invention an exemplary embodiment of the present invention may correct the composite sound output actually to the vehicle to be close to the previously stored target sound.

Figure 4:
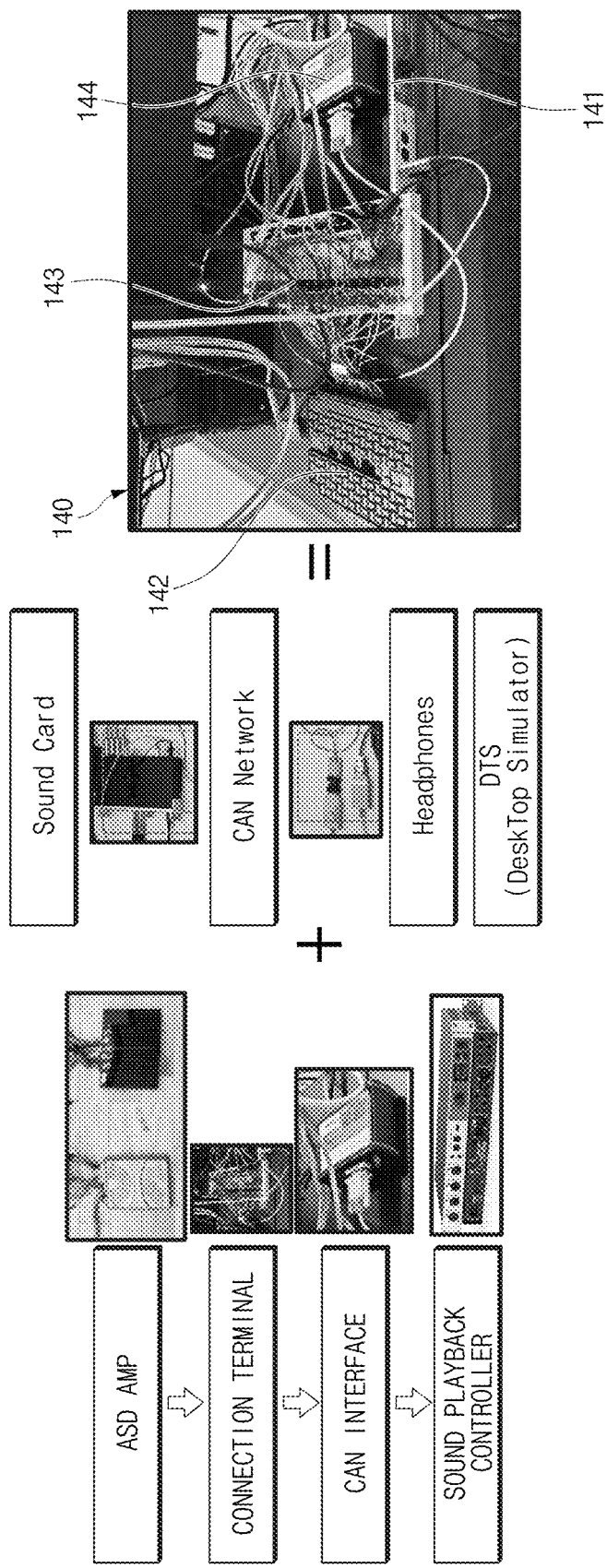
FIG. 4 is a drawing illustrating a detailed component configuration of an ASD tuning device according to various exemplary embodiments of the present invention.

FIG. 4 is a drawing illustrating a detailed component configuration of an ASD tuning device according to various exemplary embodiments of the present invention.

Referring to FIG. 4, an ASD tuning device 100 may include detailed components, such as a sound card, a CAN network, headphones, and a desktop simulator (DTS), as well as an AMP of an ASD device, a connection terminal, a CAN interface, and a sound playback controller.

Figure 5:
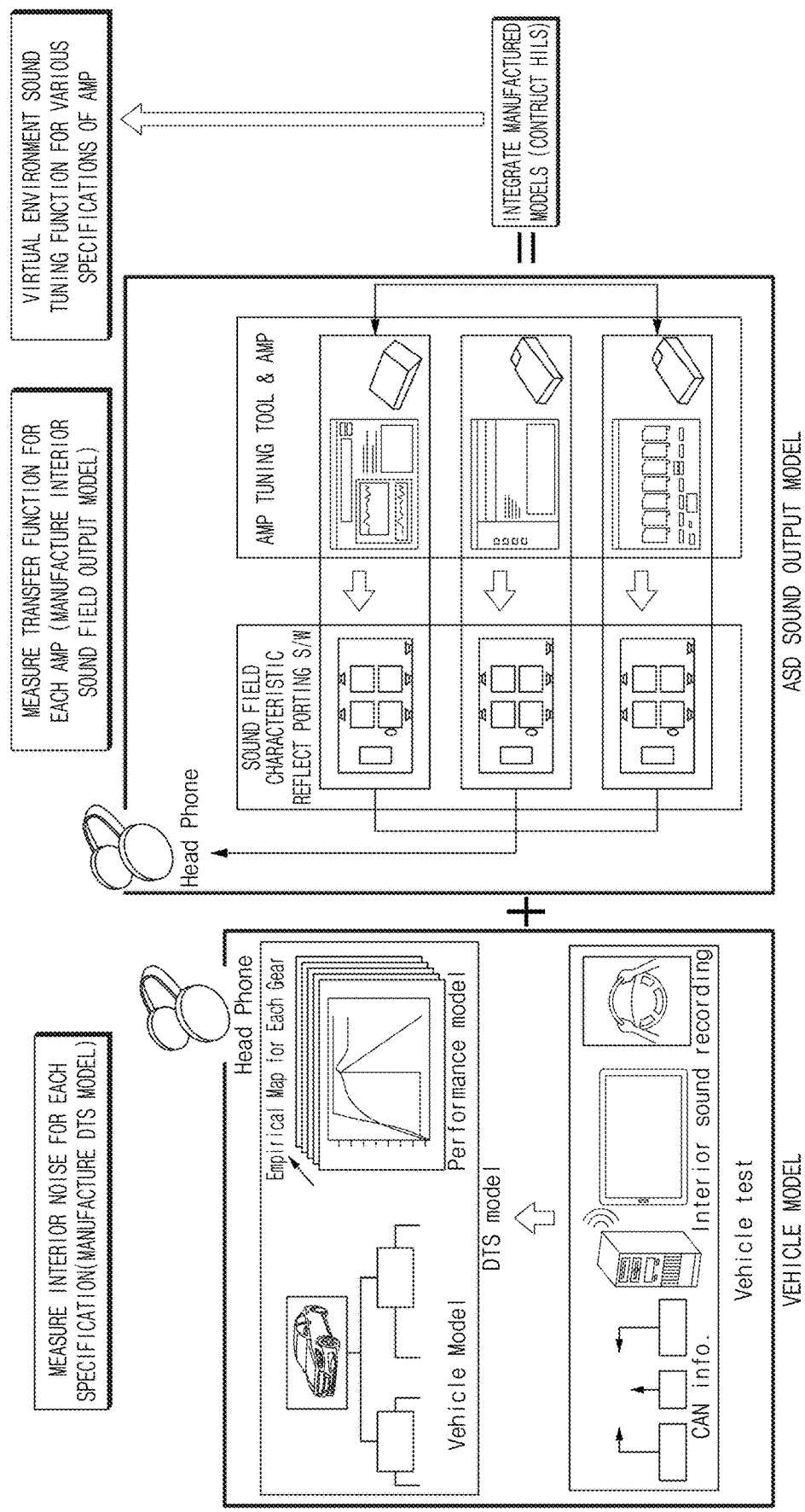
FIG. 5 is a schematic drawing illustrating an ASD tuning process according to various exemplary embodiments of the present invention.

FIG. 5 is a schematic drawing illustrating an ASD tuning process according to various exemplary embodiments of the present invention.

Referring to FIG. 5, a vehicle model for measuring internal noise of the vehicle may be constructed and an ASD sound output model for measuring a transfer function for each AMP may be constructed to output a virtual engine sound close to the real vehicle and perform sound tuning such that the virtual engine sound arrives at a target sound.

FIG. 6 is a drawing illustrating a sound tuning exemplary screen according to various exemplary embodiments of the present invention.

In FIG. 6, parameters are shown in a driving sound tuning program configured for tuning an ASD sound in virtual reality by ASD tuning S/W according to various exemplary embodiments of the present invention. Acceleration feeling or an acceleration sound factor of an electric vehicle may be analyzed by a DB for a frequency, sound pressure, an acceleration pedal, a brake, or an acceleration and deceleration driving pattern. To the present end, a driver emotion model may be constructed by the opening amount of the pedal and acceleration-based sound tuning.

The "pitch control" is a function of adjusting pitch of a virtual sound, which is a first step for volume guide. The "pitch control" is a function of assisting to perform an ASD of the electric vehicle in a virtual environment by tuning of a pitch rate and a gain level.

The "gain control" is a function of changing a tone and adjusting resistance, which is a second step for psychoacoustics-based auditory evaluation.

The "APS control" is a function of adjusting the opening amount of the accelerator pedal, which is a third step for a sound design with regard to a constant speed/acceleration driving condition of the real vehicle.

Frequency filter, volume adjustment, or Shepard layer control is a function of secondarily adjusting a sound source. It is possible to store and correct a sound source by WAV settings at the upper right side thereof.

Figure 7A:
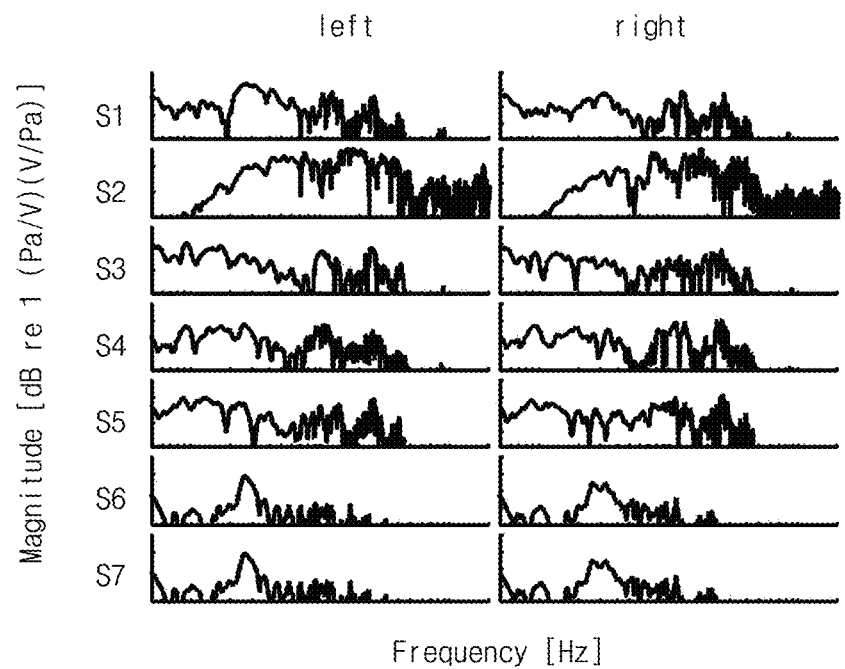
FIG. 7A, FIG. 7B, and FIG. 7C are drawings illustrating a BVIR determination process according to various exemplary embodiments of the present invention.
Figure 7B:
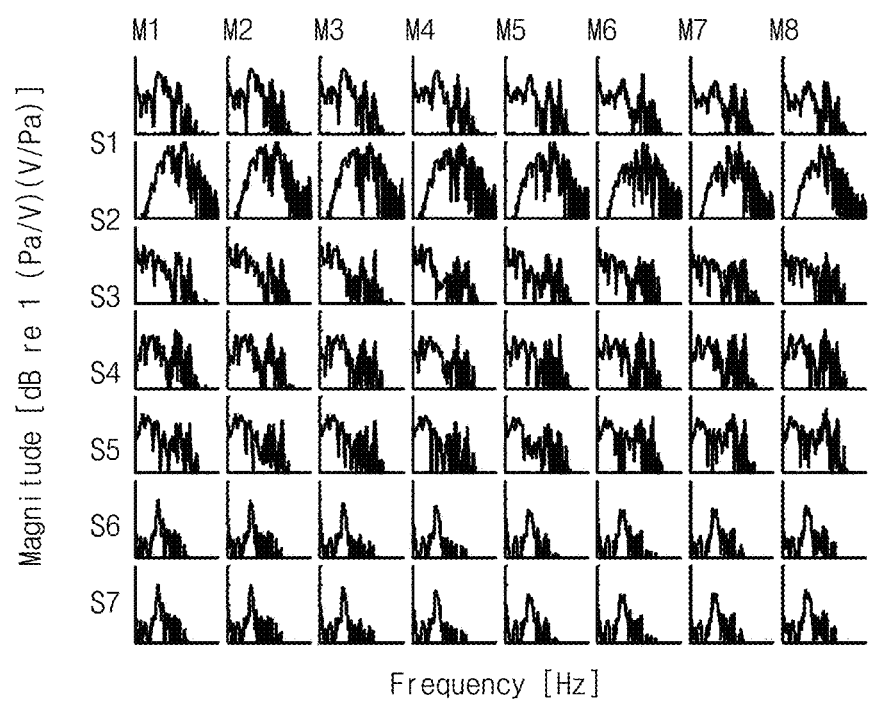
Figure 7C:
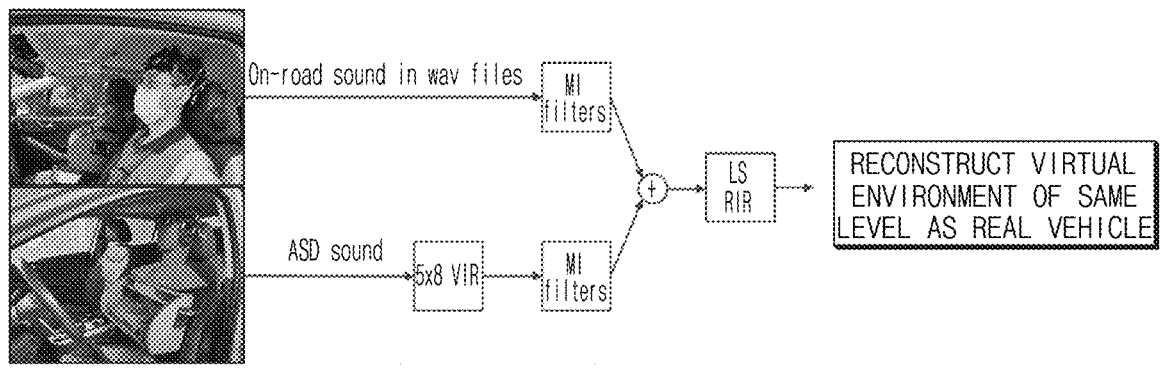

FIG. 7A, FIG. 7B, and FIG. 7C are drawings illustrating a BVIR determination process according to various exemplary embodiments of the present invention. FIG. 7A illustrates a waveform of a sound where the signal output from each of speakers S1 to 7 is delivered to both ears (left and right) of the user, when the seven speakers S1 to S7 are present in the vehicle.

FIG. 7B illustrates a waveform of a sound where the signal output from each of speakers S1 to S7 in the vehicle is input through eight microphones M1 to M8 attached spaced from the head of the user at a certain interval.

Accordingly, because the sound output from the same speaker varies in a waveform which arrives at both ears of the user, there is a need to correct it. Thus, as shown in FIG. 7C, each of a default internal sound (an on-road sound in way files) and an ASD sound may be corrected in error by a microinversion (MI) filter to reconstruct a virtual environment of the same level as the reality and generate a virtual engine sound. In other words, the ASD tuning device 100 may correct the virtual engine sound output through the real vehicle by a filter using BVIR, that is, a filter using a relationship between the ears of the user and the speaker such that the final virtual engine sound is output to be similar to the previously stored target sound.

FIG. 8 is a drawing illustrating a CAN interface development process according to various exemplary embodiments of the present invention.

Referring to FIG. 8, to develop a CAN interface 144, a fast data exchange (FDX) protocol may be used.

First of all, as Step 1, an ASD tuning device 100 may define a system variable. In other words, the ASD tuning device 100 may define an ASD tuning simulator driving signal and may extract a real-vehicle CAN signal for running an ASD algorithm.

As Step 2, the ASD tuning device 100 may perform visualization. In other words, the ASD tuning device 100 may configure an FDX protocol to interwork with the CANoe of the Vector Company.

As Step 3, the ASD tuning device 100 may construct an environment for transmitting a CAN signal and may add AAF and MCU network nodes.

Figure 9A:
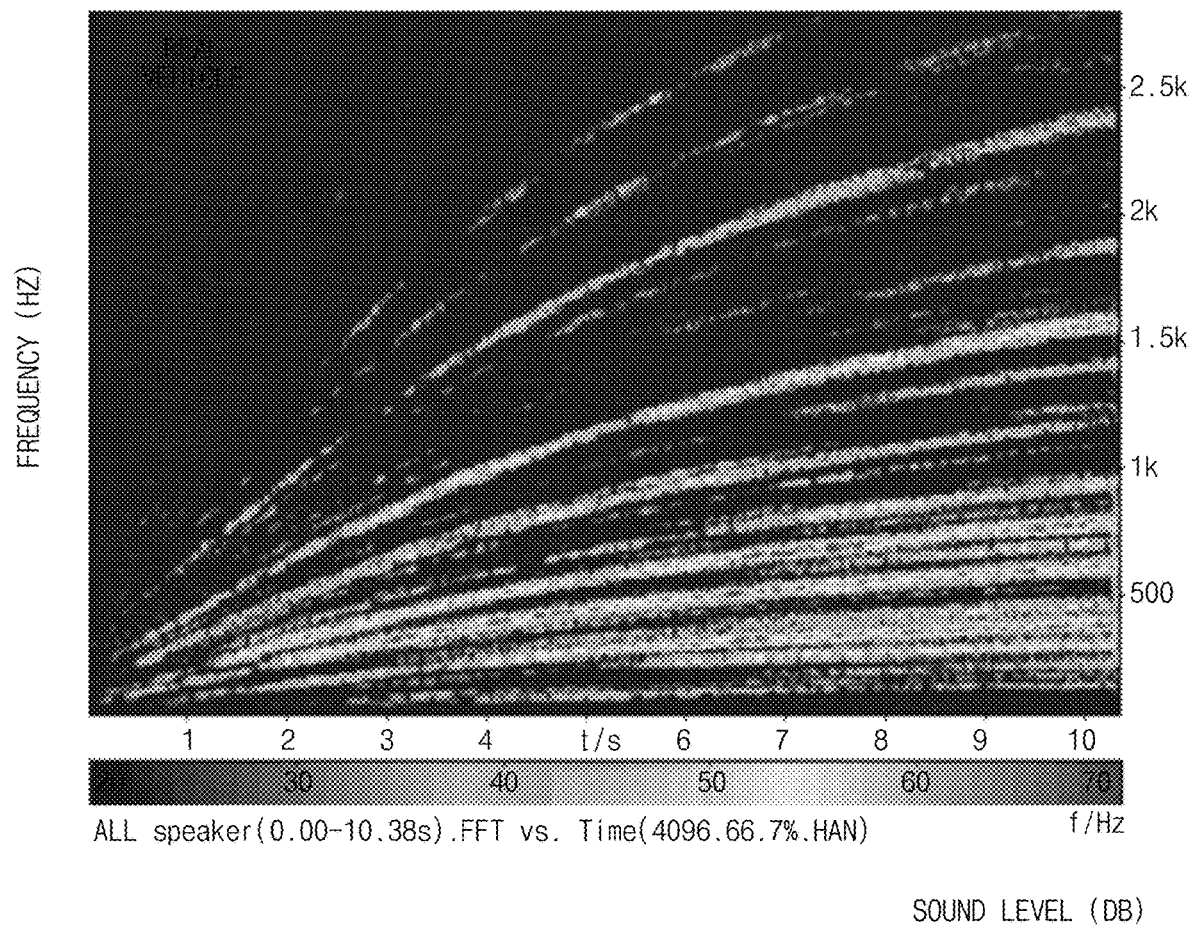
FIG. 9A is a drawing illustrating a sound tuning result in a real vehicle according to various exemplary embodiments of the present invention.
Figure 9B:
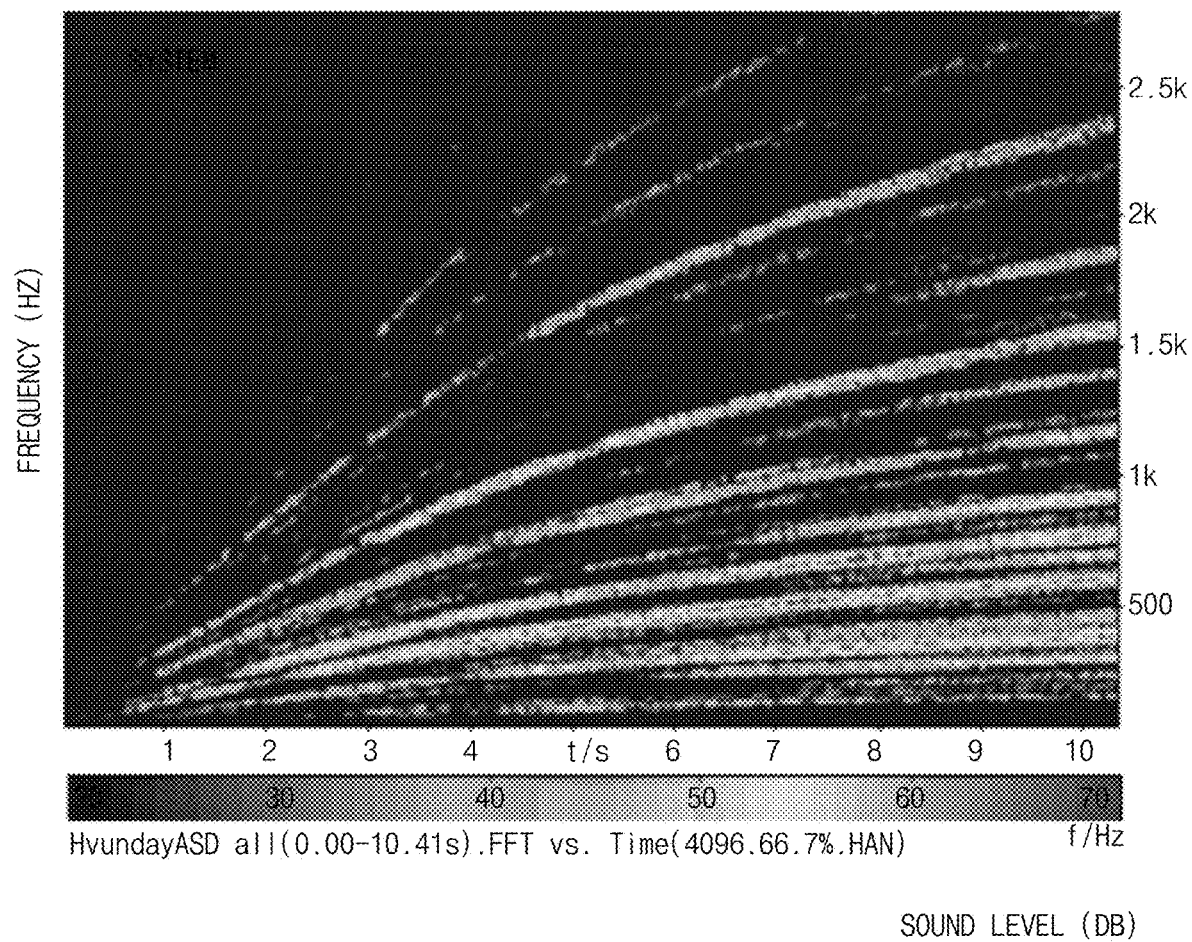
FIG. 9B is a drawing illustrating a sound tuning result in a virtual environment according to various exemplary embodiments of the present invention.

FIG. 9A is a drawing illustrating a sound tuning result in a real vehicle according to various exemplary embodiments of the present invention. FIG. 9B is a drawing illustrating a sound tuning result in a virtual environment according to various exemplary embodiments of the present invention.

Referring to FIG. 9A and FIG. 9B, it may be seen that the sound tuning result in the real vehicle is almost similar to the sound tuning result in the virtual environment.

Accordingly, an exemplary embodiment of the present invention may generate a virtual engine sound in an environment similar to the reality to verify and tune the NVH system and the ASD of the vehicle in the virtual environment.

The present technology may tune an ASD signal in a virtual environment by a program rather than a rear-vehicle test method upon ASD tuning, thus minimizing restriction of the environment and cost consumption.

Furthermore, various effects ascertained directly or indirectly through the present invention may be provided.

Hereinabove, although the present invention has been described with reference to exemplary embodiments and the accompanying drawings, the present invention is not limited thereto, but may be variously modified and altered by those skilled in the art to which various exemplary embodiments of the present invention pertains without departing from the spirit and scope of the present invention claimed in the following claims.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. An active sound design (ASD) tuning device of a vehicle, the ASD tuning device comprising:
    a simulator configured to output a composite sound in a virtual environmental condition similar to the reality;
    an ASD device configured to generate a virtual engine sound for each vehicle situation; and
    a control device configured to output the composite sound via the simulator by correcting and synthesizing the virtual engine sound and an internal sound measured for each vehicle situation based on a binaural vehicle impulse response (BVIR);
    a controller area network (CAN) interface configured to receive a CAN signal for each vehicle situation according to an operation of the simulator and to deliver the CAN signal to the ASD device and the control device; and
    a connection terminal configured to convert a format of the CAN signal delivered to the ASD device by the CAN interface,
    wherein the internal sound measured for each vehicle situation includes a recorded sound data by measuring the internal sound in the vehicle for each manipulation by a user,
    wherein the ASD device is configured to:
        generate the virtual engine sound according to the CAN signal converted by the connection terminal, and
    wherein the control device is configured to:
        compare the composite sound with a previously stored target sound, and
        output the composite sound as a final virtual engine sound, when the control device determines that the composite sound is identical to the previously stored target sound.

2. The ASD tuning device of claim 1, wherein the ASD device is configured to generate the virtual engine sound according to a tuning parameter for each vehicle situation.

3. The ASD tuning device of claim 2, wherein the tuning parameter for each vehicle situation includes at least one of pitch control, gain control, APS control, frequency filter, volume adjustment, or Shepard layer control.

4. The ASD tuning device of claim 1, wherein the control device is configured to feed back a result of comparing the composite sound with the target sound to the ASD device, when the control device determines that the composite sound is not identical to the previously stored target sound.

5. The ASD tuning device of claim 1, wherein the control device is configured to manage internal sound data measured for each vehicle situation and BVIR data being sound field characteristic information from a sound source to ears of the user.

6. The ASD tuning device of claim 1, wherein the simulator includes at least one of a player, a seat, or a virtual reality (VR) system.

7. The ASD tuning device of claim 1, wherein the control device is configured to synchronize and synthesize the internal sound with the virtual engine sound in real time.

8. The ASD tuning device of claim 1, wherein the CAN signal for each vehicle situation includes at least one of revolutions per minute (RPM), a speed, an accelerator pedal sensor (APS), or torque.

9. An active sound design (ASD) tuning method of a vehicle, the ASD tuning method comprising:
    generating, by a simulator, a CAN signal for each vehicle situation;
    receiving, by a controller area network (CAN) interface, the CAN signal for each vehicle situation according to an operation of the simulator and to deliver the CAN signal to an ASD device and a control device;
    converting, by a connection terminal, a format of the CAN signal delivered to the ASD device by the CAN interface;
    generating, by the ASD device, a virtual engine sound for each vehicle situation according to the CAN signal converted by the connection terminal; and
    outputting, by the control device, a composite sound via the simulator by correcting and synthesizing the virtual engine sound and an internal sound measured for each vehicle situation based on a binaural vehicle impulse response (BVIR),
    wherein the internal sound measured for each vehicle situation includes a recorded sound data by measuring the internal sound in the vehicle for each manipulation by a user, and
    wherein the outputting, by the control device, the composite sound via the simulator by correcting and synthesizing the virtual engine sound and the internal sound measured for each vehicle situation based on a binaural vehicle impulse response (BVIR) includes:
        comparing the composite sound with a previously stored target sound, and
        outputting the composite sound as a final virtual engine sound, when the control device determines that the composite sound is identical to the previously stored target sound.

10. The ASD tuning method of claim 9, wherein the generating of the virtual engine sound for each vehicle situation includes:
    collecting, by the control device, the CAN signal for each vehicle situation.

11. The ASD tuning method of claim 10, wherein the generating of the virtual engine sound for each vehicle situation further includes:

generating, by the control device, the virtual engine sound based on the CAN signal for each vehicle situation and a tuning parameter for each vehicle situation.

12. The ASD tuning method of claim 10, further including:
previously storing and managing internal sound data measured for each vehicle situation and BVIR data being sound field characteristic information from a sound source to ears of the user.

13. The ASD tuning method of claim 9, further including:
feeding back, by the control device, a result of comparing the composite sound with the target sound, when the control device determines that the composite sound is not identical to the previously stored target sound.

* * * * *